United States Patent [19]

White

[11] Patent Number: 4,538,778
[45] Date of Patent: Sep. 3, 1985

[54] DUAL TOWLINE SPIN-RECOVERY DEVICE

[75] Inventor: William L. White, Wicomico, Va.

[73] Assignee: The United States of America as represented by the Administrator of the National Aeronautics and Space Administration, Washington, D.C.

[21] Appl. No.: 532,342

[22] Filed: Sep. 15, 1983

[51] Int. Cl.³ ............................................. B64C 17/00
[52] U.S. Cl. .................................. 244/75 R; 244/139; 244/113
[58] Field of Search ............. 244/139, 140, 141, 75 R, 244/138 R, 113, 15, 3, 17 D

[56] References Cited

U.S. PATENT DOCUMENTS

| 1,556,502 | 10/1925 | Doucett . | |
|---|---|---|---|
| 1,888,418 | 11/1932 | Adams . | |
| 2,392,448 | 1/1946 | Atherton . | |
| 2,436,988 | 3/1948 | Bell | 244/3 |
| 2,458,212 | 1/1949 | Smith . | |
| 2,478,758 | 8/1949 | Frieder et al. . | |
| 2,719,685 | 10/1955 | Sender et al. . | |
| 2,941,751 | 6/1960 | Gagarin | 244/15 |
| 3,222,014 | 12/1965 | Bowden et al. | 244/113 |
| 3,747,877 | 7/1973 | Drew | 244/139 |
| 3,930,628 | 1/1976 | Robeler | 244/139 |
| 4,040,583 | 8/1977 | Bihrle, Jr. . | |

FOREIGN PATENT DOCUMENTS

| 787102 | 12/1957 | United Kingdom | 244/113 |
|---|---|---|---|
| 2036668 | 7/1980 | United Kingdom | 244/113 |

Primary Examiner—Galen L. Barefoot
Attorney, Agent, or Firm—Howard J. Osborn; John R. Manning; Wallace J. Nelson

[57] ABSTRACT

A device which corrects aerodynamic spin wherein a parachute 38 exerts anti-spin forces on an aircraft 10 to effect spin recovery. The dual parachute towlines 30 and 32 are each attached to the parachute 38 and are attached to the rear fuselage equidistant to and on opposite sides of the aircraft centerline, at 25 and 27. As the parachute 38 is deployed during spin, the parachute force 40 acts through only the towline 30, and exerts its force outboard of center on the aircraft 10. As a result, the parachute exerts not only an anti-spin torque, but additionally causes the aircraft to roll, creating a gyroscopic anti-spin rolling moment. The additional anti-spin rolling moment facilitates spin recovery by permitting a relatively smaller parachute to accomplish spin recovery equivalent to that of a larger parachute attached to the center of the rear fuselage. The relatively smaller parachute enables spin recovery while minimizing the aerodynamic, structural and in-flight complications associated with larger parachutes and chute forces.

11 Claims, 4 Drawing Figures

DUAL TOWLINE SPIN-RECOVERY DEVICE

ORIGIN OF THE INVENTION

The invention described herein was made by an employee of the U.S. Government and may be manufactured and used by or for the Government for governmental purposes without the payment of any royalties thereon or therefor.

INTRODUCTION

Hazardous maneuvers are commonplace during flight testing, and a rigorous flight test program can cause even the best of pilots to lose control of the aircraft. The most dangerous maneuver is the steep climb; if the aircraft stalls, it can fall off into a spin in which the aircraft rotates about its center of mass with rapid loss of altitude. In the event that ordinary aerodynamic controls are inadequate to stop the spin, a spin-recovery parachute (or other spin-recovery force) provides emergency recovery.

The present invention was developed to permit equivalent correction of flat spins as accomplished by existing devices, but which would maximize the safety, structural simplicity and efficiency of the anti-spin parachute and its associated aircraft.

BACKGROUND OF THE INVENTION

With prior art arrangements, flat spins were commonly broken by a single towline parachute deployed from the rear of the aircraft. The parachute exerted an anti-spin torque by exerting a force, opposite to the spin, through the moment arm extending from the aircraft center of mass to the point of chute attachment at the midline of the rear fuselage. These spin-recovery parachutes were frequently installed for use during flight testing of the aircraft, but their installation not only introduced error into the results of those flight tests but created so many design problems that the chutes were seldom incorporated into operational fighter or commercial planes. The large diameter parachutes and long towlines required stowage compartments in the rear fuselage, and the compartments produced undesirable deviations from the production contours of the air craft. The large chute forces in addition, required substantial structural reinforcement of the aircraft to enable it to withstand the high design load of the chute, and such reinforcements altered the mass distribution of the aircraft and its subsequent flight test performance.

Wingtip recovery parachutes, developed and tested during World War II, avoided some of the above difficulties but created problems of their own. By enabling or facilitating "rolling into the spin," the wingtip parachute can apply a rolling moment to the aircraft to produce a significant gyroscopic recovery moment. ("Rolling into the spin" is a gyroscopic phenomenon, well known to fighter pilots, which causes the rate of aerodynamic spin to decrease.) Each wingtip of the aircraft is equipped with a stowed parachute and, in the event of spin, one of them is deployed; the pilot must determine the direction of the spin and choose the appropriate wingtip chute. Unfortunately, the pilot is likely to be severely disoriented during a spin and unable to determine quickly which wingtip chute to deploy; if the pilot chooses the wrong one, the aircraft will "roll out of the spin," not into it, and the spin rate will increase. Furthermore, because the wingtip chutes cause rather violent recoveries, usually followed by spins in the opposite direction, the wingtip chute must be released immediately upon spin recovery. The continuing disorientation of the pilot, sometimes resulting from "eyeballs out" g's, renders this tricky parachute jettison even more difficult.

OBJECTS OF THE INVENTION

Accordingly, it is an object of the present invention to provide a spin-recovery parachute which functions to exert not only an anti-spin torque, but an additional gyroscopic anti-spin rolling moment to facilitate aircraft spin recovery.

Another object of the invention is to provide a bifurcated or dual towline parachute, with towline attachment points at either side of the center of the rear fuselage, such that the parachute may exert an outboard anti-spin torque, and create an anti-spin rolling moment, during aircraft spins of any direction or inversion.

A further object of the invention is to provide a means for correcting spin which incorporates a parachute, the size of which will minimize or eliminate need for a stowage compartment whose dimensions alter the production contours of the aircraft.

Still another object of the invention is to provide a means for correcting spin which incorporates a parachute, the chute load of which will minimize or eliminate the necessity of structural reinforcement of the aircraft.

Yet another object of the invention is to provide a parachute which applies a gyroscopic recovery moment to the aircraft and ceases automatically to apply such a moment without requiring immediate jettison of the parachute to prevent a spin in the opposite direction.

The foregoing and additional objects are attained by providing a device to correct aerodynamic spin comprising a dual equilateral towline or symmetrical bifurcated towline anti-spin device, such as a parachute, with each of two attachment points positioned on the rear fuselage at equal outboard distances from the centerline. This configuration enables a parachute to exert its force on the aircraft through two separate moment arms. The first moment arm extends in an aftward direction from the aircraft center of mass to the locus of parachute force application on the rear fuselage. The second moment arm extends perpendicularly to and in an outboard direction from the aircraft centerline, terminating at the aforementioned locus of parachute force application on the rear fuselage.

The parachute acts upon the aircraft through the first moment arm to exert an anti-spin torque and nose-down pitching moment on the aircraft, and through the second moment arm to exert an upward force on one side of the rear of the aircraft to cause the aircraft to roll into the spin. Because the second moment arm creates an additional anti-spin moment and thus increases the anti-spin effectiveness of any given parachute, the dual towline mechanism therefore permits a relatively smaller parachute to accomplish spin correction equivalent to that of a larger, single towline chute. The operation of the two moment arms together permits equivalent spin recovery with a parachute whose required diameter decreases as an inverse function of the increasing length of the second moment arm. The use of a relatively smaller parachute, to accomplish equivalent spin recovery, minimizes the aerodynamic, structural and in-flight complications which accompany the larger chutes and chute forces.

Other objects and advantages of the present invention will become more readily apparent to those skilled in the art as the same becomes better understood with reference to the following deacription and drawings.

DETAILED DESCRIPTION OF THE INVENTION

Figure 1:
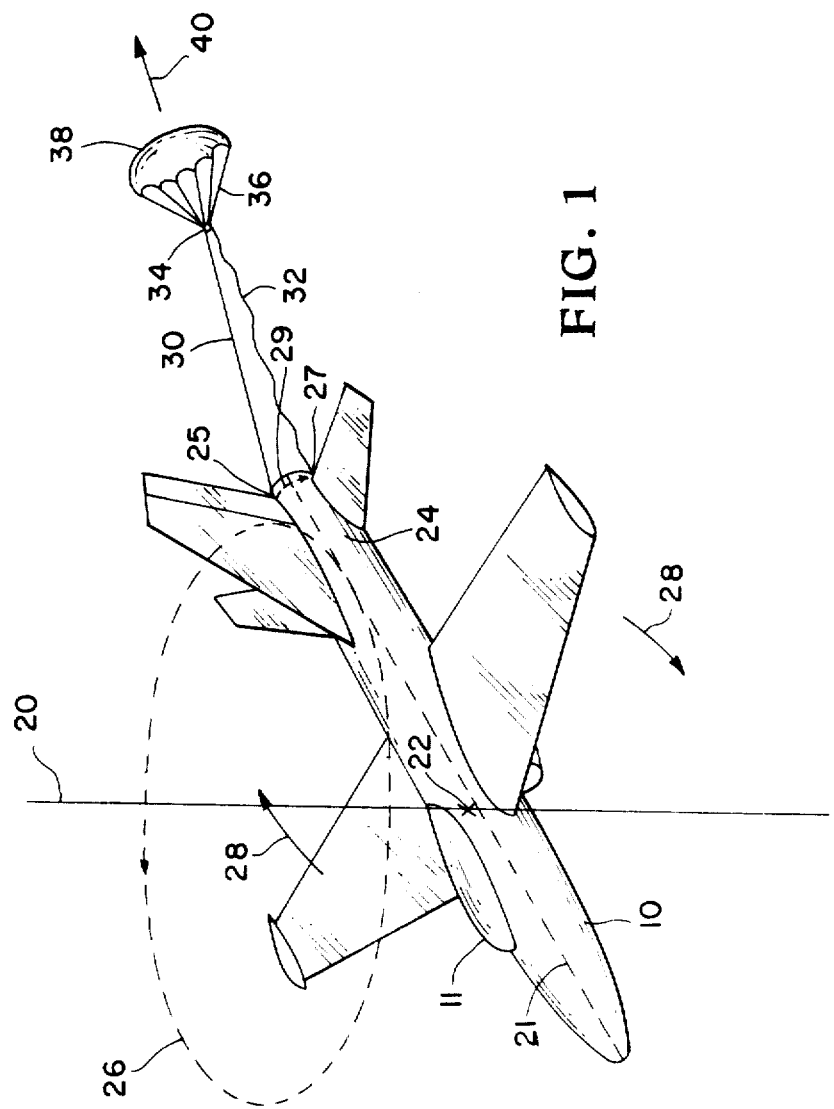
FIG. 1 is a perspective view of the invention in which the dual towline parachute is shown exerting its force opposite to the direction of the spin and outboard of the aircraft centerline to create an anti-spin rolling moment.

Referring now to the drawings and initially to FIG. 1, a test aircraft 10 has intentionally or inadvertently encountered an aerodynamic spin; the descending aircraft rotates about the vertical spin axis 20 through the aircraft center of mass 22. The invention allows a parachute 38 to exert a parachute force 40 to oppose the direction of spin 26 to allow the pilot to recover and resume normal flight. The preferred embodiment of the invention includes a nylon parachute 38, having shroud lines 36, attached via parachute ring 34 to a functional towline 30 and a trailing towline 32; the functional towline 30 and the trailing towline 32 are releasably attached to the rear fuselage at attachment points 25 and 27. Each attachment point 25 and 27 is offset outboard of the aircraft centerline 21 by an equal amount. A representative attachment mechanism, whereby the functional towline 30 and the trailing towline 32 are each releasably secured to the aircraft is disclosed in FIG. 3 of U.S. Pat. No. 4,040,583 to Bihrle.

Figure 2:
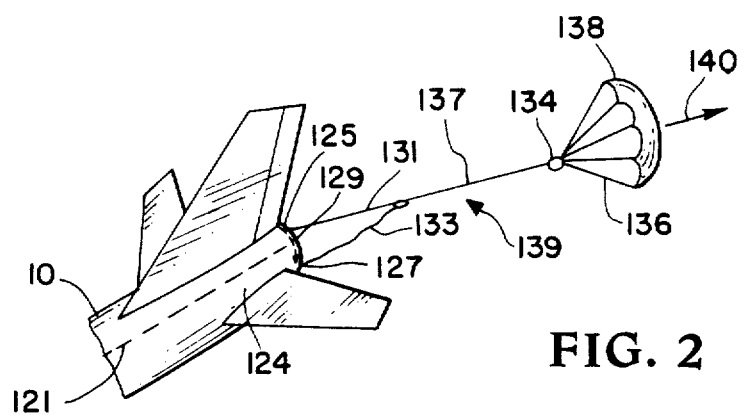
FIG. 2 is a partial perspective view of the alternate embodiment of the invention in which the bifurcated towline parachute exerts its force opposite to the direction of the spin and outboard of the aircraft centerline to create an anti-spin rolling moment.

The structure of the alternate embodiment of the invention (FIG. 2) differs from that of the preferred embodiment only in that the functional towline 30 and the trailing towline 32 are replaced by the bifurcated towline 139 which includes the functional bridle towline 131, the trailing bridle towline 133 and the bridle mounted towline 137. The bifurcated towline 139 includes, therefore, a single aftward end and two forward ends by reason of the bridle mounted towline 137 and the functional and trailing bridle towlines 131 and 133. The functional bridle towline 131 and the trailing bridle towline 133 are each attached to the rear fuselage at attachment points 125 and 127 by means of the Bihrle attachment mechanism cited above. Each of the attachment points 125 and 127 is located on the rear fuselage 124 at equal and opposite outboard distances from the aircraft centerline 121. The parachute 138 is identical to that of the preferred embodiment of the invention; the parachute 138 is nylon in construction and includes shroud lines 136 and parachute ring 134.

OPERATION

Under normal circumstances, the aircraft 10 operates without need of an emergency spin-recovery device. For this reason, during ordinary flight, the parachute 38, the shroud lines 36 and the towlines 30 and 32 are folded and stored in a conventional chute pack located within the rear fuselage 24 of the aircraft. Each towline 30 and 32 is attached to the aircraft on opposite sides of the centerline at the attachment points 25 and 27, respectively, by means of the Bihrle attachment mechanism cited above. In the event of aerodynamic spin, the pilot deploys the parachute from its chute pack via ordinary parachute deployment means known in the art. After the pilot deploys the parachute 38, it inflates behind the aircraft in a direction which opposes the spin. The parachute exerts a force which effects spin recovery in two ways; the parachute exerts the usual anti-spin torque and nose-down pitching moment and provides an additional anti-spin rolling moment on the aircraft 10.

Figure 3:
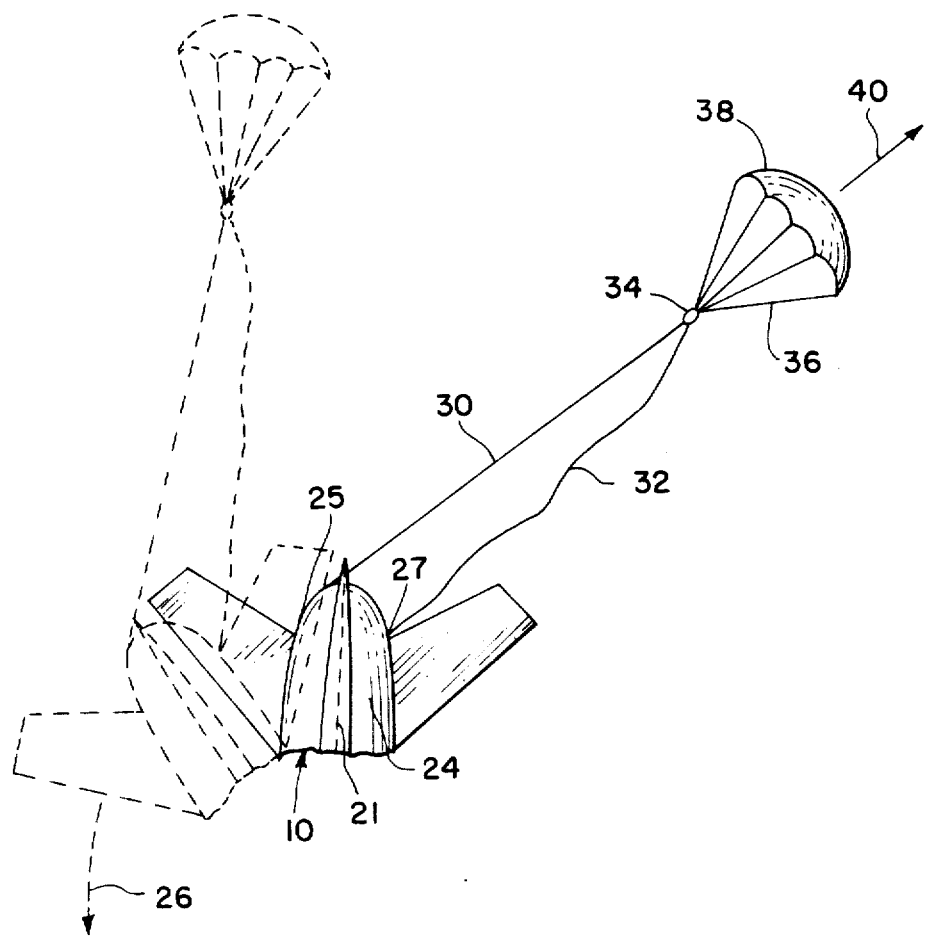
FIG. 3 is a partial plan view of the aircraft and the attached parachute immediately after chute deployment from the spinning aircraft.

Referring now to FIG. 3, a plan view of the invention illustrates the exertion of an anti-spin torque on the aircraft 10 by the parachute 38. The parachute 38 acts through a moment arm which extends in an aftward direction from the aircraft center of mass 22 to the attachment point 25 on the rear fuselage 24 of the aircraft 10. The parachute force 40 exerts an anti-spin torque on the aircraft 10 in the direction opposite to that of the direction of spin 26; the torque is exerted on the aircraft 10 by means of the functional towline 30 via the moment arm as described. This torque effects spin recovery in the same manner as does the torque exerted by conventional rear-deployed spin-recovery chutes. If the aircraft 10 spins in the direction opposite to that shown, the functional towline 30 will become the trailing towline and the trailing towline 32 will become the functional towline. In either case, however, the parachute force 40 will be exerted on the aircraft 10 via the "functional towline." The magnitude and direction of the anti-spin torque are equivalent to the anti-spin torque components of conventional anti-spin parachutes of similar towline length and chute load.

The parachute 38 does not correct spin, however, solely by exerting an anti-spin torque on the aircraft 10. As shown in FIG. 1, the parachute force 40 also causes the aircraft 10 to roll by exerting a rotational force 29 on the aircraft 10 at the attachment point 25. The rotational force 29 is an anti-spin rolling moment exerted by the parachute force 40 through a second moment arm which extends perpendicularly to and in an outboard direction from the aircraft centerline to the attachment point 25. This anti-spin rolling moment, created as the aircraft "rolls into the spin," constitutes a spin-recovery force which is additive with the anti-spin torque exerted through the first moment arm. In other words, the combination of anti-spin rolling moment with an anti-spin torque effects spin recovery to a degree greater than would be possible with either the torque or the rolling moment taken singly as shown by the yaw rate equation:

$$\dot{r} = \frac{M_2\,(acro)}{I_z} + \frac{I_x - I_y}{I_z} pq.$$

This equation shows in the second term that yaw acceleration, $\dot{r}$, is affected by cross-coupling with roll, p, and pitch, q. The anti-spin torque and the anti-spin rolling moment, therefore, occur simultaneously to oppose and correct the spin.

The phenomenon of an anti-spin rolling moment, caused by "rolling into the spin," is well known to fighter pilots and to others in the aerodynamic art. Indeed, fighter pilots are trained to effect spin recovery by rolling into the spin via aileron control surfaces, although this technique is frequently unreliable. The theory behind this phenomenon was articulated by a physicist named Euler, in his equations of motion. Euler teaches that a massive, spinning body resists being disturbed, according to a special form of Newton's law, and that a certain direction of roll will actually increase the rate of spin. For example, if a flat body is spinning in a plane parallel to the Earth and clockwise as viewed from above, it will spin faster if the left side of the spinning object tilts down toward the center of the Earth. An opposite roll, however, in which the right side of the spinning object tilts downward, will impede spin by means of a gyroscopic anti-spin rolling moment. These latter circumstances, extrapolated to a spinning aircraft, are known to pilots as "rolling into the spin" to impede the rotation of the aircraft.

After the spin is corrected, the pilot releases the parachute 38. Redundant release mechanisms, known in the art, may be provided. As the aircraft 10 is readied for its next flight, replacements for the parachute 38, the functional towline 30 and the trailing towline 32 are provided.

Operation of the alternate embodiment of the invention is identical to the preferred embodiment except that the parachute force 140 is exerted on the aircraft via functional bridle towline 131, while the trailing bridle towline 133 remains slack. The parachute 138 and all associated structures operate as described above creating both an anti-spin torque and an anti-spin rolling moment.

Figure 4:
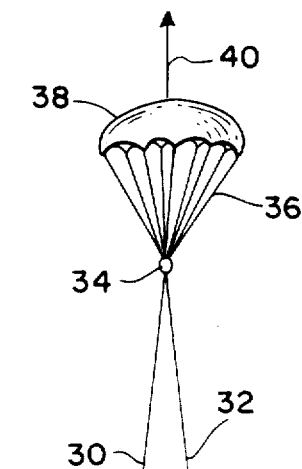
FIG. 4 is a partial plan view of the aircraft and the attached parachute after spin correction.
Figure 4:
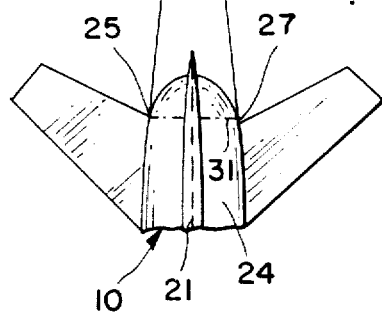

FIG. 4 illustrates the position of the parachute 38 relative to the aircraft 10 after spin recovery is accomplished and before the pilot jettisons the parachute 38. As the aircraft 10 dives out of the spin, the parachute 38 trails directly behind the aircraft. As a result of the symmetrical arrangement of the towlines 30 and 32, the parachute force 40 is exerted equally on the rear fuselage 24 at attachment points 25 and 27. The parachute force 40 has a direction co-linear with the aircraft centerline, and thus exerts neither anti-spin torque nor anti-spin rolling moment from this position. Accordingly, as the aircraft dives out of the spin, the anti-spin effects of the parachute automatically cease; no residual unwanted forces remain to create a spin in the opposite direction or cause other difficulties to the pilot.

The effectiveness of the present invention is best illustrated by actual comparison of its chute load with that required by a conventional centerline-deployed anti-spin parachute. The actual test embodiment of the invention accomplished spin recovery in four turns of the aircraft; a conventional antispin parachute also accomplished recovery in four turns but entailed more than twice the calculated parachute load as did the present invention. The dimensions and calculations for each respective device are provided below.

The test model of the alternate embodiment of the invention comprised an F-18 fighter aircraft with a distance from the center of mass to the tip of the rear fuselage of 14.1 feet. The functional and trailing bridle towlines 131 and 133 were each 20 feet; the bridle mounted towline was 54.8 feet and secured a parachute 25.2 feet in diameter. The shroud length of the parachute was also 25.2 feet, yielding a total towline length of 100 feet. The 25.2 feet parachute diameter determined the chute force by the equation $F = C_D q S$, where F is the parachute load or force, $C_D$ is the drag coefficient of the specific nylon parachute employed, q is the freestream dynamic pressure of the descending aircraft and S is the parachute area calculated by one-half diameter $^2\pi$. Under actual test conditions, the 25.2 feet diameter parachute exerted a calculable force of 19,052 pounds. Spin recovery was complete after four turns of the aircraft.

The conventional anti-spin parachute accomplished spin recovery in four aircraft turns and comprised an F-18 fighter aircraft with a distance from the center of mass to the tip of the rear fuselage of 14.4 feet. The single towline was 62.6 feet and secured a parachute 37.4 feet in diameter. The shroud length of the parachute was also 37.4 feet, yielding a total towline length of 100 feet. The calculated chute load was 41,966 pounds under identical test conditions. The conventionally mounted parachute, herefore, required a chute load greater than twice that of the test embodiment of the invention to accomplish equivalent spin recovery.

Because the present invention exerts both an anti-spin torque and an anti-spin rolling moment, spin recovery may be effected by a relatively smaller parachute as described. The relatively smaller parachute force of the present invention minimizes chute load on the structural components of the aircraft and reduces the necessity of structural reinforcements. The smaller parachute has a smaller surface area and requires less storage space than did the conventional spin chutes; the smaller chute minimizes the need for bulky stowage compartments which alter the production contours of the aircraft.

Various changes may be made in the shape, size and arrangement of parts without departing from the spirit or scope of the invention. It is therefore to be understood that the invention may be practiced otherwise than as specifically described and claimed herein.

What is claimed as new and desired to be secured by Letters Patent of the United States is:

1. A device for recovering an aircraft from an uncontrollable aerodynamic spin during aircraft operation comprising:
   an aircraft having a rear surface;
   means in addition to the conventional aircraft controls for applying force to said rear surface;
   means for orienting said means for applying force to said rear surface to exert an anti-spin yaw and an anti-spin rolling moment acting together on said aircraft and to automatically cease to exert both said anti-spin yaw and said anti-spin rolling moment upon correction of the spin;
   said means for orienting and applying a force being of a size and shape so as to allow said aircraft to fly after spin recovery without removing said means; and
   attachment means for securing said means for orienting said means for applying force to the rear of said aircraft.

2. The combination as in claim 1 wherein said means for applying force to said aircraft is a parachute.

3. The combination as in claim 2 wherein said means for orienting said parachute is a double towline.

4. The combination as in claim 2 wherein said means for orienting said parachute is a bifurcated towline having a single aftward end and two forward ends.

5. The combination as in claim 3 wherein said two adjacent aftward ends of said double towline are attached to said parachute and wherein said two forward ends of said double towline are secured to said attachment means.

6. The combination as in claim 4 wherein said bifurcated towline is attached to said parachute at said single aftward end and wherein said two forward ends of said bifurcated towline are secured to said attachment means.

7. The combination as in claim 5 wherein said attachment means is two fastening means affixed to said aircraft, each of which is located outboard of the aircraft centerline.

8. The combination as in claim 6 wherein said attachment means is two fastening means affixed to said aircraft, each of which is located outboard of the aircraft centerline.

9. The combination as in claim 5 wherein said attachment means is two fastening means affixed to said aircraft, each of which is located at opposite outboard sides of and at an equal distance from the aircraft centerline.

10. The combination as in claim 6 wherein said attachment means is two fastening means affixed to said aircraft, each of which is located at opposite outboard sides of and at an equal distance from the aircraft centerline.

11. A method of effecting recovery of an aircraft from a condition of uncontrollable spin comprising the steps of:

providing an aircraft having a rear surface;

attaching means in addition to conventional controls for applying force to said rear surface;

orienting said means in addition to conventional controls for applying force to said aircraft to exert an anti-spin yaw and simultaneously an anti-spin rolling moment on said aircraft and to automatically cease to exert both said anti-spin yaw and anti-spin rolling moment upon correction of the spin; and continuing to fly the aircraft after spin recovery without removing said orienting and additional force applying means.

* * * * *